United States Patent [19]

Pingel et al.

[11] Patent Number: 4,957,138
[45] Date of Patent: Sep. 18, 1990

[54] ANTI-SIPHONING DEVICE FOR A RESERVE METERING VALVE

[76] Inventors: Wayne H. Pingel; Donna M. Pingel, both of Rte. 1, Box 303, Grand Marsh, Wis. 53936

[21] Appl. No.: 119,077
[22] Filed: Nov. 10, 1987
[51] Int. Cl.$^5$ .............................................. E03B 3/18
[52] U.S. Cl. .................................... 137/549; 137/590
[58] Field of Search ...................... 137/590, 544, 549

[56] References Cited

U.S. PATENT DOCUMENTS 2,673,571  3/1954  Lerom ................................. 137/590
3,291,184  12/1966  Varvel ................................. 137/590
4,250,921  2/1981  Pingel et al. ........................ 137/590

FOREIGN PATENT DOCUMENTS 1202003  1/1960  France ................................. 137/590

Primary Examiner—A. Michael Chambers
Attorney, Agent, or Firm—Douglas B. White

[57] ABSTRACT

There is provided apparatus for eliminating syphoning of fuel from a filter screen enclosed standpipe reserve metering valve comprising a sleeve member positioned within the filter screen, circumscribing and extending above and below the standpipe upper extremity.

9 Claims, 1 Drawing Sheet

ANTI-SIPHONING DEVICE FOR A RESERVE METERING VALVE

BACKGROUND OF THE INVENTION

1. Field of the Invention

The present invention relates generally to the art of reserve metering valves and particularly to the field of fuel line control valves designed to control flow from a tank. More specifically, the present invention relates to devices used to prevent inadvertent siphoning of fuel from the tank of a motorcycle via the filter screen surrounding the standpipe of the reserve metering valve.

2. Description of the Prior Art

Reserve metering valves employing a standpipe are generally old in the art and are particularly popular as fuel control valves. Generally, reserve metering valves comprise a body member exhibiting multiple orifices and conduits therein. A valve member is mounted within this body to selectively connect certain conduits to the outgoing orifice. Typically, one conduit would be connected to the standpipe and arranged to draw fuel therethrough. A second conduit would be connected to an inlet at a lower point within the tank and arranged to draw fuel therethrough upon selection by the control valve.

When these reserve metering devices such as that shown in my prior U.S. Pat. No. 4,250,921 are used on vehicles and particularly on motorcycles, they employ a filter screen enveloping the standpipe and the lower level inlet. With this configuration and with a strong suction through the valve, there is a tendency for fuel, the level of which is below the standpipe orifice, to flow up the screen and to be sucked into the standpipe. No device has been developed to date which is available to reduce or eliminate this siphoning of the reserve, even though failure to control this effect will often cause total loss of the fuel reserve.

Accordingly it is a principle object of the present invention to provide a device for eliminating the tendency of the reserve metering valves to siphon the reserve fuel via the filter screen.

It is a further object of the present invention to provide an uncomplicated and inexpensive solution to the siphoning problem.

It is finally an object of the present invention to provide a device for eliminating the siphoning problem which may be easily retro-fitted to existing valves.

SUMMARY OF THE INVENTION

In accordance with the invention described herein there is provided an anti-siphon device for insertion within the filter screen and surrounding the standpipe orifice. This device is comprised of a sleeve member adhered to the inner surface of the screen and extending both above and below the standpipe orifice. When the fuel level drops below the level of the standpipe orifice, fuel will be prevented from being drawn up the filter screen and into, the orifice.

Other objects and advantages of the invention will become apparent upon reading the following detailed description and upon reference to the drawings.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
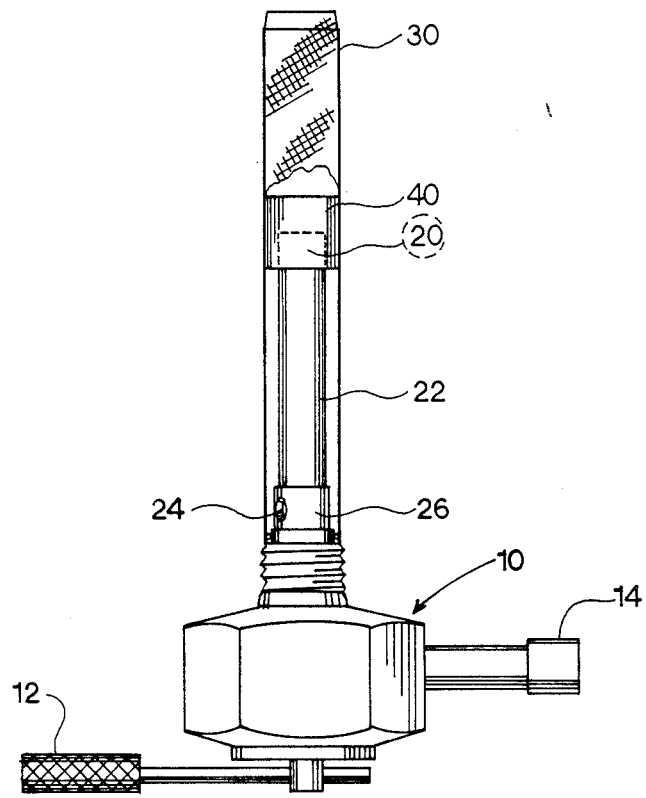
FIG. 1 is a perspective view of a reserve metering fuel valve in accordance with the present invention having a standpipe protruding upwards therefrom and a filter screen enveloping the standpipe, and showing the location and positioning of the anti-siphon sleeve adhered to the inside of the filter screen.
Figure 2:
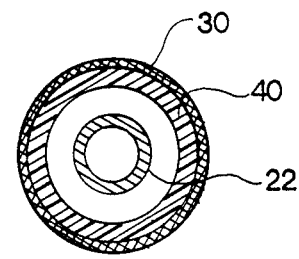
FIG. 2 illustrates a cross sectional view of the valve of FIG. 1 employing the anti-siphon sleeve, where the cross section is taken through the area of the standpipe enveloped by the anti-siphon sleeve.

Turning first to FIG. 1 there is shown a reserve metering valve in accordance with the present invention having a main body member 10. Mounted within the main body of the valve there is provided passage way selection means controlled by lever 12. This lever selectively interconnects one of a plurality of inlets to the outlet 14. A more detailed description of the internal operation of a valve of this type is set out in my earlier U.S. Pat. No. 4,250,921 issued Feb. 17, 1981.

Dual inlets are provided to the valve, with the first and primary inlet being an orifice 20 at the upper extremity of a standpipe 22 extending upwardly into a fuel tank wherein this valve is mounted. The second of the inlets is an orifice 24 positioned at the lower extremity of the standpipe. In one version of the reserve metering valve the inlet selection member 12 is used to rotate the standpipe in order to match an orifice at its lower end with that provided in a lower sleeve 26 surrounding the standpipe.

Enclosing the inlets there is provided a filter screen 30 comprised of a wire mesh. In operation without the antisyphon device of the present invention, fuel is drawn upwards on this filter screen and communicated into the valve through the upper standpipe extremity by force of the vacuum in the standpipe. In order to prevent this phenomena, according to the preferred embodiment of the invention, there is adhered to the inside of the wire mesh an anti-siphon sleeve 40.

This anti-siphon sleeve of the present invention is an impervious member of cylindrical shape arranged to be mounted proximate the upper extremity of the standpipe. In the preferred embodiment the sleeve is mounted to extend both above and below the standpipe orifice; and it may be mounted to either the standpipe or to the screen mesh. As an example of the present invention, working with a standpipe having an outside diameter between 0.380 to 0.385 inches and the wire screen with an inside diameter of 0.500 inches, a sleeve arranged to be mounted to the screen is preferred having an inside diameter of 0.410 inches and being 0.440 inches in height.

In this embodiment of the invention the sleeve is adhered to the inside of the screen by use of an epoxy glue to provide a clearance between the sleeve and the standpipe of between 0.125 inches to 0.015 inches per side. Tests on variations of the dimensions of this sleeve have indicated that the extension of the sleeve beyond the upper most extremity of the standpipe by more than 0.250 inches tends to reduce the flow through the valve, while a height lower than 0.250 tends to allow siphoning.

In a variation of this invention, the sleeve member may be adhered to the standpipe. In this arrangement the sleeve extends above and below the upper extremity of the standpipe as before but exhibits an outer diameter sufficient to cause contact with the screen.

The anti-siphon device described is a simple one piece cylindrical sleeve which is mounted in such a position as to interfere with the suction of the standpipe orifice. This prevents the fuel from being drawn up the filter screen and siphoned into the standpipe. This design of the preferred embodiment facilitates retro-fitting of existing valves by the insertion of the sleeve into the existing filter screen. Yet, in a further embodiment of the invention an improved filter screen may exhibit an interruption of its porus character over a range extending above and below the upper extremity of the standpipe, and exhibiting the dimensions described for the cylindrical sleeve.

I claim:

1. An anti-siphon device for attachment to a reserve metering valve having a standpipe with an orifice at its upper extremity and a filter screen surrounding the standpipe to prevent the siphoning of liquid upwards on the filter screen surrounding the standpipe comprising:
   a sleeve member arranged to circumscribe the standpipe and mounted proximate the upper extremity of the standpipe in contact with the screen, and extending above and below the standpipe orifice.

2. The anti-siphon device of claim 1 wherein said sleeve member is mounted to the screen.

3. The anti-siphon device of claim 2 wherein said sleeve member is adhered to the screen.

4. In a standpipe reserve metering valve having a hollow standpipe with an orifice at its upper extremity, a filter screen surround the standpipe and means for selectively communicating fluid through the standpipe at its lower extremity, the improvement comprising an anti-siphon sleeve member arranged to circumscribe the standpipe and extending above and below the orifice at the upper extremity of the standpipe, said sleeve member being mounted in contact with the screen.

5. The reserve metering valve of claim 4 wherein said sleeve member is mounted to the screen.

6. The reserve metering valve of claim 5 wherein said sleeve member is adhered to the screen 7. In a standpipe reserve metering valve having a hollow standpipe with an upper orifice at its upper extremity, a filter screen surrounding the standpipe, and means for selectively communicating fluid through the standpipe at its lower extremity, the improvement comprising an improved filter screen having flow interference means proximate the upper orifice of the standpipe for preventing vacuum draw within the standpipe from pulling fluid upwardly on the filter screen and into the upper orifice of the standpipe.

8. The reserve metering valve of claim 7 wherein said flow interference means comprises an impervious interruption of the filter screen which extends above and below the upper orifice of the standpipe.

9. The reserve metering valve of claim 8 wherein said flow interference means extends inward into the gap between the standpipe and the filter screen.

* * * * *